Dec. 17, 1929.                    C. C. FARMER                    1,739,583
                              QUICK SERVICE DEVICE
                              Filed Dec. 9, 1927
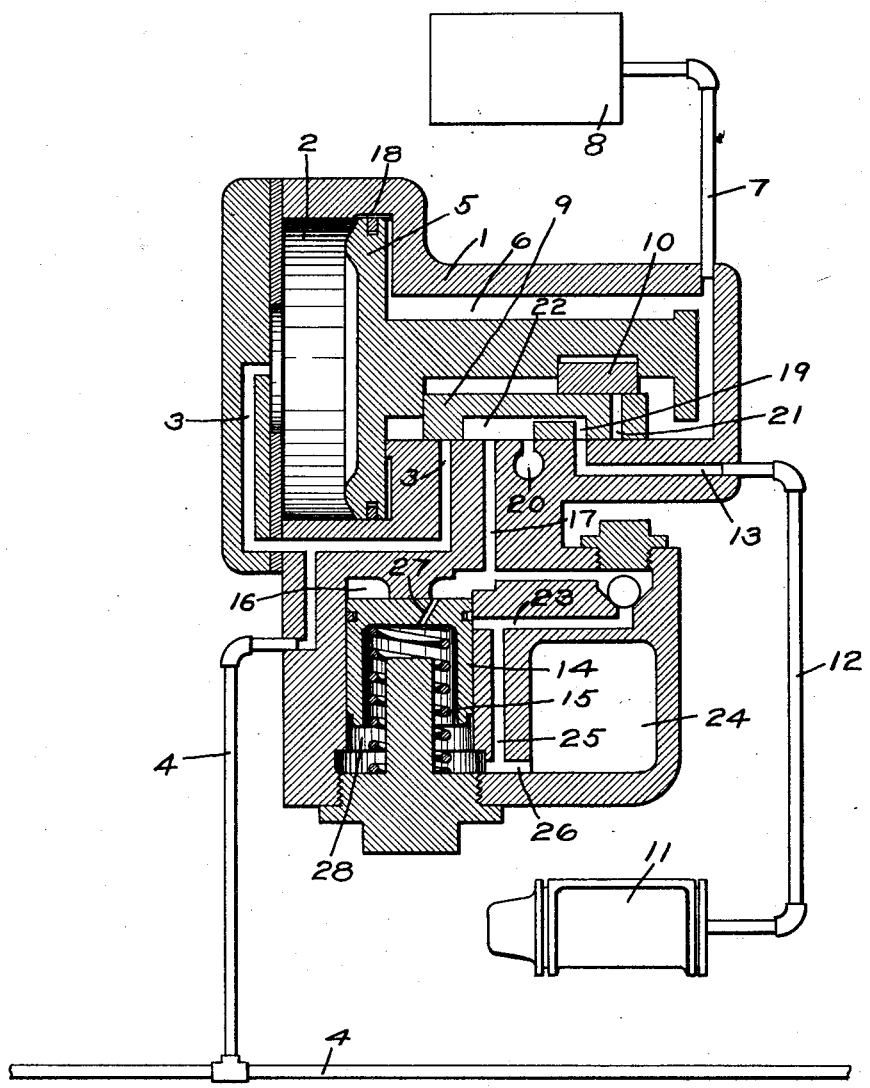
INVENTOR
CLYDE C FARMER
BY  *Wm. M. Cady*
                    ATTORNEY Patented Dec. 17, 1929

1,739,583

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

QUICK-SERVICE DEVICE

Application filed December 9, 1927. Serial No. 238,832.

This invention relates to fluid pressure brakes, and more particularly to a triple valve device having means for venting fluid from the brake pipe to effect a quick serial service application of the brakes.

It is desirable to vent fluid from the brake pipe to cause quick service action at as high a rate as possible, but if the quick service vent port is made too large, then, particularly on a long train, a surge of increased pressure is liable to be created in the brake pipe which tends to cause the brakes to be released.

The principal object of my invention is to provide a quick service device in which fluid is vented from the brake pipe at a maximum rate, without causing such a surge in pressure in the brake pipe, as would be liable to effect the release of the brakes.

In the accompanying drawing, the single figure is a diagrammatic sectional view of a fluid pressure brake apparatus embodying my invention.

The triple valve device shown in the drawing is of the type in which the piston makes full traverse in effecting a service application of the brakes and comprises a casing 1 having a piston chamber 2 connected through passage 3 with the usual brake pipe 4 and containing a piston 5 and having a valve chamber 6 connected through pipe 7 with the usual auxiliary reservoir 8 and containing a main slide valve 9 and an auxiliary slide valve 10 having the usual movement relative to the main slide valve, said valves being operable by the piston 5.

The brake cylinder 11 is connected to pipe 12 and passage 13 which leads to the seat of slide valve 9, and contained in casing 1 is a valve piston 14, subject on one side to the pressure of a coil spring 15 and having chamber 16 at the opposite side open to a passage 17 leading to the seat of slide valve 9.

When the brake pipe is charged with fluid under pressure in the usual manner, the piston 5 is shifted to its release position, as shown in the drawing, and fluid flows from piston chamber 2, through the usual feed groove around the piston 5 to valve chamber 6 and charges the auxiliary reservoir 8. In this position, the brake cylinder 11 is connected through passage 13 and cavity 19 in slide valve 9 with exhaust port 20.

When the brake pipe pressure is reduced to effect a service application of the brakes, the triple valve piston moves toward the left, first shifting the auxiliary valve 10 so as to uncover the service port 21 and then moving the main slide valve 9 so that port 21 registers with passage 13. Fluid under pressure is then supplied from the valve chamber 6 and the auxiliary reservoir 8 to the brake cylinder in the usual manner.

In application position of slide valve 9, cavity 22 connects passage 3 with passage 17, so that fluid under pressure from the brake pipe is supplied to chamber 16 and acts on valve piston 14 to shift same downwardly against the pressure of spring 15. A passage 23 is uncovered by this movement of the valve piston, so that fluid is vented at a rapid rate from the brake pipe to the quick service chamber 24, through passage 23, passage 25, and passage 26 and thereby effects a local venting of fluid from the brake pipe to produce the well known quick serial venting of fluid from the brake pipe throughout the train.

When the pressure of fluid in chamber 16 has been reduced to a degree slightly less than the pressure of spring 15 plus the pressure of fluid in quick service chamber 24 which acts in the spring chamber 28, the valve piston 14 is shifted to its upper position, in which communication from chamber 16 to passage 23 is cut off.

In the upper position of the value piston 14, fluid under pressure continues to be vented from the brake pipe through a restricted port 27 in the valve piston to spring chamber 28 and thence through passage 26 to the quick service chamber 24, until the pressure in the brake pipe has equalized with the pressure in the quick service chamber.

It will thus be seen that the device operates to first vent fluid from the brake pipe to the vent chamber 24 at a high rate and then at a slower rate, so as to prevent the creation of a surge of pressure through the brake pipe such as would tend to cause the release of the brakes.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with a brake pipe, brake cylinder, and a triple valve device operated upon a reduction in brake pipe pressure for supplying fluid under pressure to the brake cylinder, of means operative in applying the brakes for first venting fluid from the brake pipe at a rapid rate through a large opening and then at a slow rate through a small opening.

2. In a fluid pressure brake, the combination with a brake pipe, brake cylinder, and a triple valve device operated upon a reduction in brake pipe pressure for supplying fluid under pressure to the brake cylinder, of means operative upon movement of said triple valve device to apply the brakes for first venting fluid from the brake pipe to a chamber at a rapid rate through a port of large flow capacity and then at a slow rate through a port of small flow capacity.

3. In a fluid pressure brake, the combination with a brake pipe, brake cylinder, and a triple valve device operated upon a reduction in brake pipe pressure for supplying fluid under pressure to the brake cylinder, of a piston operated by brake pipe pressure upon movement of said triple valve device to apply the brakes for opening a large communication from the brake pipe to a chamber, and a spring acting on said piston and operating said piston upon a predetermined reduction in brake pipe pressure for cutting off said communication.

4. In a fluid pressure brake, the combination with a brake pipe, brake cylinder, and a triple valve device operated upon a reduction in brake pipe pressure for supplying fluid under pressure to the brake cylinder, of a piston operated by brake pipe pressure upon movement of said triple valve device to apply the brakes for opening a large communication from the brake pipe to a chamber, and a spring acting on said piston and operating said piston upon a predetermined reduction in brake pipe pressure for cutting off said communication, said piston having a restricted port through which fluid is vented from the brake pipe to said chamber.

In testimony whereof I have hereunto set my hand.

CLYDE C. FARMER.